(No Model.)
H. FISHER.
REIN HOLDER.
No. 309,703. Patented Dec. 23, 1884.
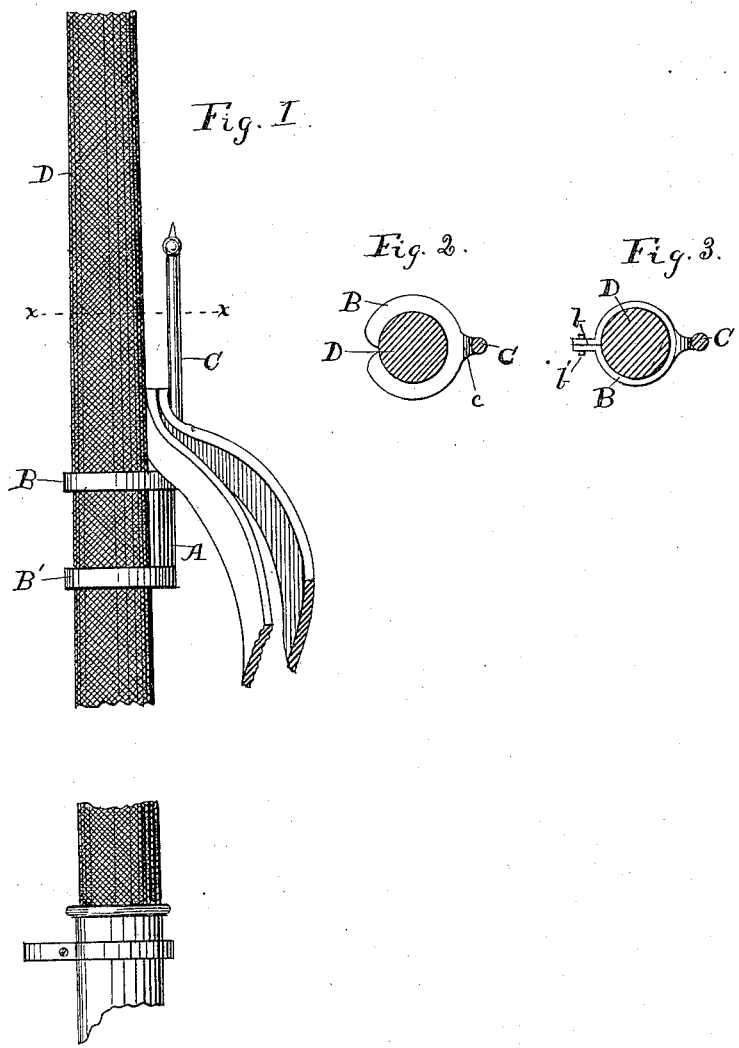

UNITED STATES PATENT OFFICE.

HENRY FISHER, OF CANTON, OHIO.

REIN-HOLDER.

SPECIFICATION forming part of Letters Patent No. 309,703, dated December 23, 1884.

Application filed January 22, 1884. (No model.)

*To all whom it may concern:*

Be it known that I, HENRY FISHER, a citizen of the United States, residing at Canton, in the county of Stark and State of Ohio, have invented certain new and useful Improvements in Rein-Holders, of which the following is a specification, reference being had therein to the accompanying drawings.

My invention relates to a light, cheap, and tastily-constructed rein-holder, which is adapted to be attached to and carried by a carriage-whip, but which in no wise impairs the usefulness of the whip.

Figure 1 is a side elevation of my rein-holder attached to a carriage-whip, the reins being shown secured thereby. Fig. 2 is a section of the same on the line $x\,x$. Fig. 3 is a similar section of a modified form.

In the drawings, A represents a plate of metal, curved or made concave upon its inner face, so as to conform to the circumference of a carriage-whip.

B B' are clamping-jaws extending, respectively, from the top and the bottom of the plate A, adapted to encircle the whip D, and to secure the rein-holder in position.

C is an upwardly-extending stem or finger lying parallel with the whip. At its lower end this part C is curved, as at $c$, so as to leave a space between the stem C and the whip, in which space the reins are confined, the whip operating by its elasticity as a spring to confine the reins and prevent their being accidentally withdrawn.

I prefer to make the rein-holder of malleable metal, so that the jaws B B' may be bent to closely grasp the whip, and thus secure the holder in any desired position.

When constructed of iron and japanned, a very tasty device is produced, and one which may be furnished at a trifling cost. When desired, it may be plated with nickel, silver, or other metal, and highly ornamented. However, I do not wish to be confined to the use of malleable metal, as one of cast-iron may be used and secured in place by wedging or otherwise. The rein-holders may be secured to and sold with the whips, or they may sold separately, and attached to the whip at pleasure. Nor do I wish to be confined to the exact construction shown, as various forms will readily suggest themselves.

In Fig. 3 I have shown a construction in which the jaws B are made elastic, and provided with flanges $b\,b$ at their outer ends, which are adapted to be drawn close together and secured by a screw, $b'$, or otherwise; or the jaws B B' may be united, and extend from the top to the bottom of plate A; or in place of the jaws there may be rings, the holder being then slipped over the small end of the whip and crowded into place.

A rein-holder of the character shown may be attached to the top or side supporting-rod of a dash-board, when thus attached the reins being confined between the stem C and said rod of the dash-board.

I am aware that whip-sockets and rein-holders of various sorts have been bolted or clamped to the side and top rods of the dash-boards of vehicles, and I do not claim, broadly, a rein-holder having clamping devices adapted to encircle a cylindrical body.

I am also aware that rein-supports having rings or loops at their lower ends have been attached to vehicles by slipping said rings over the shafts or the pole of the vehicle, the rein-supporting portion extending above the back of the horse or horses, and adapted to hold the reins when dropped by the driver and prevent them from falling to one side of or between the horses, and I do not claim such devices.

I am also aware that rein-holders having a part moved by a spring, adapted to confine the reins against a rigid part of the rein-holder, have been attached to various permanent parts of vehicles, and I do not claim such devices, as my invention dispenses entirely with the need of such springs; and I am further aware that a rein-holder has been attached to the bar or rod of a dash-board, it consisting of two plates of metal pivoted together eccentrically, so that the movement of one plate locks or clamps the reins by reason of said eccentric pivoting, and this construction I also desire to disclaim.

What I claim is—

1. The herein-described rein-holder, it consisting of a whip, in combination with a bar or stem secured thereto, and lying parallel with and at a short distance from the whip, the whip operating by its elasticity as a spring to press the reins against the stem and to hold them, substantially as set forth.

2. The herein-described rein-holder, it consisting in the combination of the whip, the stem C, having a shoulder, $c$, at its lower end, and clamping devices situated below the said shoulder, substantially as set forth.

3. The herein-described new article of manufacture, consisting of the plate A, the clamping devices adapted to encircle a whip, and the stem C, projecting from said plate A, all said parts being formed integrally from a single piece of metal, and adapted to be attached to a whip to form a rein-holder, substantially as set forth.

4. The herein-described metallic article to be used as a rein-holder, consisting of plate A, spring-jaws B B', provided with flanges $b\ b$ at their outer or free ends, means for securing the flanges together, and the stem C, shouldered at $c$, substantially as set forth.

In testimony whereof I affix my signature in presence of two witnesses.

HENRY FISHER.

Witnesses:
J. P. FAWCETT,
S. L. McDERMIT.